(12) United States Patent
Takahashi

(10) Patent No.: US 9,124,599 B2
(45) Date of Patent: Sep. 1, 2015

(54) NETWORK SYNCHRONIZATION SYSTEM AND INFORMATION PROCESSING APPARATUS

(75) Inventor: Naoto Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 353 days.

(21) Appl. No.: 12/923,855

(22) Filed: Oct. 12, 2010

(65) Prior Publication Data
US 2011/0113469 A1    May 12, 2011

(30) Foreign Application Priority Data
Nov. 6, 2009   (JP) ................... 2009-255322

(51) Int. Cl.
| | |
|---|---|
| G06F 7/04 | (2006.01) |
| G06F 17/30 | (2006.01) |
| H04N 7/16 | (2011.01) |
| G06F 15/177 | (2006.01) |
| G06F 15/16 | (2006.01) |
| H04L 29/06 | (2006.01) |
| H04L 29/08 | (2006.01) |
| H04L 12/24 | (2006.01) |

(52) U.S. Cl.
CPC .......... *H04L 63/104* (2013.01); *H04L 41/0893* (2013.01); *H04L 63/102* (2013.01); *H04L 63/306* (2013.01); *H04L 67/303* (2013.01)

(58) Field of Classification Search
CPC . H04L 41/0893; H04L 67/306; H04L 63/102; H04L 63/10; H04L 63/104; H04L 67/303; G06F 17/30699; G06F 17/30702
USPC ............... 726/2–5, 26–29; 709/248, 220–229
See application file for complete search history.

(56) References Cited

U.S. PATENT DOCUMENTS

| | | | |
|---|---|---|---|
| 7,133,933 B2* | 11/2006 | Shah et al. .................... | 709/248 |
| 7,912,916 B2* | 3/2011 | Rakowski et al. ............ | 709/217 |
| 8,024,488 B2* | 9/2011 | Salowey et al. ................... | 710/5 |

(Continued)

FOREIGN PATENT DOCUMENTS

| | | |
|---|---|---|
| JP | 2005-250939 | 9/2005 |
| JP | 2006-268587 | 10/2006 |

(Continued)

*Primary Examiner* — Tae Kim
(74) *Attorney, Agent, or Firm* — Harness, Dickey & Pierce, P.L.C.

(57) ABSTRACT

In a network synchronization system, setting information synchronized among plural information processing apparatuses contains at least user information; user operating policy information; first equipment group information that prescribes a first equipment group to which the information processing apparatus belongs; and equipment operating policy information. The information processing apparatus includes a user authentication unit; a storage unit that stores the setting information and second equipment group information that prescribes a second equipment group to which the information processing apparatus belongs; and an operating policy generation unit that generates an applied operating policy to be applied to a login user. The operating policy generation unit generates, when the second equipment group information is contained in the first equipment group information, the applied operating policy in accordance with the equipment operating policy information corresponding to the first equipment group information in preference to the user operating policy information corresponding to authenticated user information.

15 Claims, 11 Drawing Sheets

(56) References Cited

U.S. PATENT DOCUMENTS

| | | | |
|---|---|---|---|
| 8,082,316 B2* | 12/2011 | Rakowski et al. | 709/213 |
| 8,166,516 B2* | 4/2012 | McCollum et al. | 726/1 |
| 2001/0013064 A1* | 8/2001 | Cox et al. | 709/220 |
| 2002/0010807 A1* | 1/2002 | Multer et al. | 709/328 |
| 2002/0174372 A1* | 11/2002 | Venkataraman | 713/400 |
| 2003/0005088 A1* | 1/2003 | Remer | 709/220 |
| 2003/0217181 A1* | 11/2003 | Kiiskinen | 709/248 |
| 2004/0015573 A1* | 1/2004 | Yuki et al. | 709/220 |
| 2004/0098472 A1* | 5/2004 | Styles et al. | 709/221 |
| 2006/0123080 A1* | 6/2006 | Baudino et al. | 709/204 |
| 2007/0208834 A1* | 9/2007 | Nanamura et al. | 709/220 |
| 2007/0260751 A1* | 11/2007 | Meesseman | 709/248 |
| 2007/0283049 A1* | 12/2007 | Rakowski et al. | 709/246 |
| 2008/0086545 A1* | 4/2008 | Fatt et al. | 709/220 |
| 2008/0201585 A1 | 8/2008 | Takagi et al. | |
| 2009/0006652 A1* | 1/2009 | Kasatani | 709/248 |
| 2009/0249431 A1* | 10/2009 | McCollum et al. | 726/1 |

FOREIGN PATENT DOCUMENTS

| | | |
|---|---|---|
| JP | 2007-172049 | 7/2007 |
| JP | 2008-227884 | 9/2008 |
| JP | 2009-033706 | 2/2009 |
| JP | 2009-064177 | 3/2009 |
| JP | 2009-070293 | 4/2009 |

* cited by examiner

FIG.5

EQUIPMENT INFORMATION

1. HOST NAME: MFP1
2. IP ADDRESS: *.*.*.*
3. MAC ADDRESS: :::::
4. AUTHORITY GROUP
   1) EQUIPMENT GROUP: △△△
   ...

FIG.6

SYSTEM SETTING INFORMATION

<MANAGEMENT SETTINGS>
1. SECURITY
   1) OPERATING POLICY
      (1) FUNCTION LIMITATION
          (a) ACCUMULATION: AUTHORIZED         APPLICABLE
          (b) PRINTING: AUTHORIZED              APPLICABLE
              (b-1) BLACK-AND-WHITE PRINTING: AUTHORIZED    NOT APPLICABLE
              (b-2) FULL-COLOR PRINTING: AUTHORIZED         NOT APPLICABLE
   ...

USER INFORMATI

<USER 1>
1. PERSONAL INFORMATION
 1) PERSONAL NAME: ABCDE
 2) USER NAME: aaaa
 3) PASSWORD: ******
 4) AUTHORITY GROUP
  (1) USER GROUP: ○○○
 5) OPERATING POLICY
  (1) FUNCTION LIMITATION
   (a) ACCUMULATION: AUTHORIZED
   (b) PRINTING: AUTHORIZED
    (b-1) BLACK-AND-WHITE PRINTING: AUTHORIZED
    (b-2) FULL-COLOR PRINTING: AUTHORIZED

...

<USER 2>
1. PERSONAL INFORMATION
 1) PERSONAL NAME: FGHIJ
 2) USER NAME: abcd
 3) PASSWORD: ******
 4) AUTHORITY GROUP
  (1) USER GROUP: ×××
 5) OPERATING POLICY
  (1) FUNCTION LIMITATION
   (a) ACCUMULATION: AUTHORIZED
   (b) PRINTING: AUTHORIZED
    (b-1) BLACK-AND-WHITE PRINTING: AUTHORIZED
    (b-2) FULL-COLOR PRINTING: AUTHORIZED

USER GROUP MANAGEMENT INFORMATION

<USER GROUP 1>
1) GROUP NAME: ○○○
2) OPERATING POLICY
   (1) FUNCTION LIMITATION
      (a) ACCUMULATION: AUTHORIZED      APPLICABLE
      (b) PRINTING: AUTHORIZED            APPLICABLE
         (b-1) BLACK-AND-WHITE PRINTING: AUTHORIZED    APPLICABLE
         (b-2) FULL-COLOR PRINTING: AUTHORIZED        APPLICABLE
...

<USER GROUP 2>
1) GROUP NAME: ×××
2) OPERATING POLICY
   (1) FUNCTION LIMITATION
      (a) ACCUMULATION: UNAUTHORIZED    APPLICABLE
      (b) PRINTING: AUTHORIZED            APPLICABLE
         (b-1) BLACK-AND-WHITE PRINTING: AUTHORIZED    APPLICABLE
         (b-2) FULL-COLOR PRINTING: UNAUTHORIZED     APPLICABLE
...

FIG.9

EQUIPMENT GROUP MANAGEMENT INFORMATION

<EQUIPMENT GROUP 1>
1) GROUP NAME: △△△
2) OPERATING POLICY
   (1) FUNCTION LIMITATION
      (a) ACCUMULATION: UNAUTHORIZED     NOT APPLICABLE
      (b) PRINTING: AUTHORIZED     APPLICABLE
         (b-1) BLACK-AND-WHITE PRINTING: AUTHORIZED     APPLICABLE
         (b-2) FULL-COLOR PRINTING: UNAUTHORIZED     APPLICABLE

...

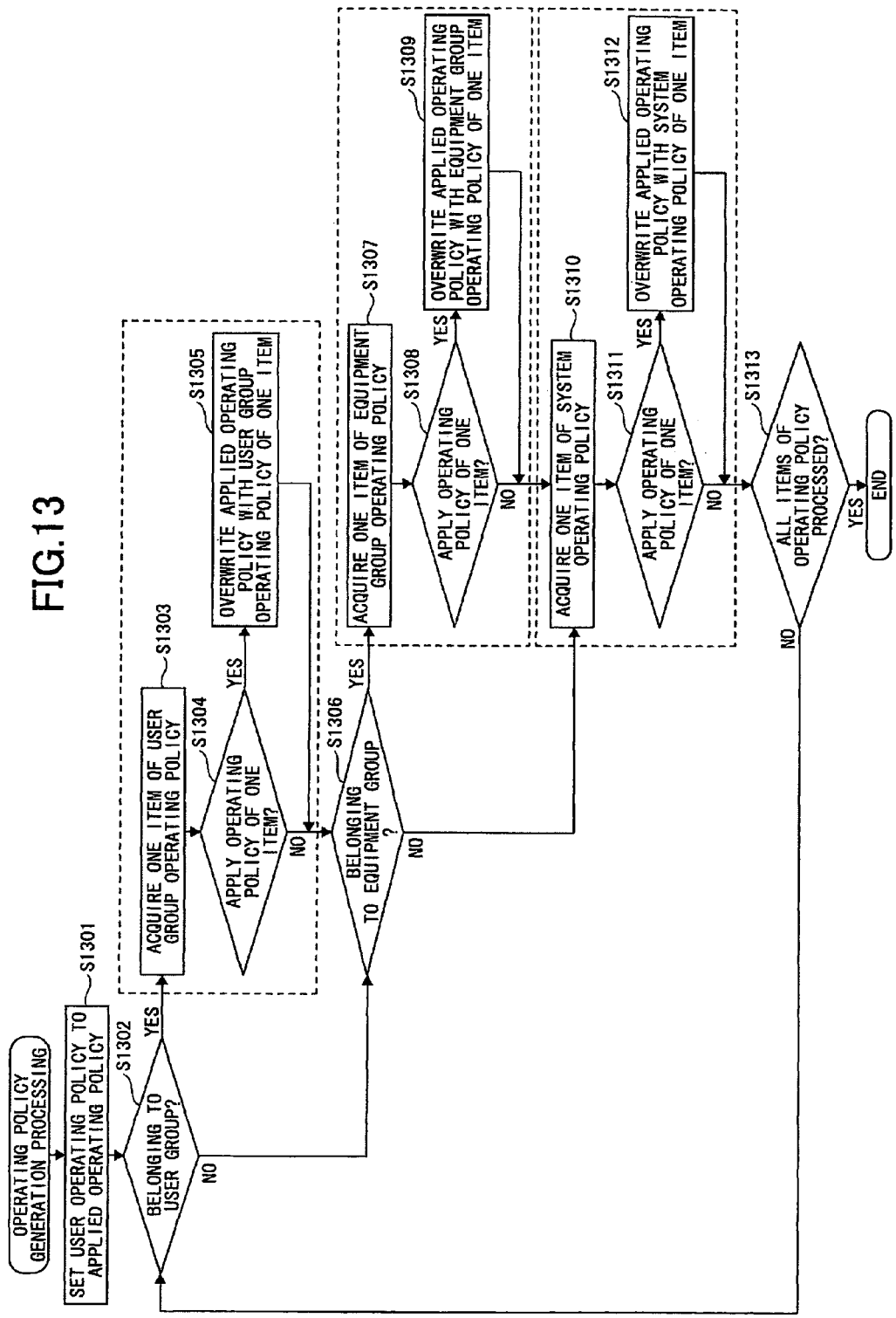

NETWORK SYNCHRONIZATION SYSTEM AND INFORMATION PROCESSING APPARATUS

BACKGROUND OF THE INVENTION

1. Field of the Invention

The present invention relates to a network synchronization system and an information processing apparatus.

2. Description of the Related Art

With the technological advancement of digital multi-function peripherals (MFPs) such as improvements in the performance of CPUs (Central Processing Units), the high capacity of memory units, high-speed communications technology, and highly-developed digital imaging technology, the digital MFPs (hereinafter referred to as image forming apparatuses) have not only functions as digital copiers but also functions as networked facsimile machines, printers, and scanners, and are used in a variety of situations according to users' environments.

In using such an image forming apparatus, user authentication is generally required in many cases. In other words, when input user authentication information matches authentication information previously registered in the image forming apparatus, the use of the image forming apparatus is authorized. However, in case the user is required to connect the image forming apparatus to plural other image forming apparatuses via a network, if the plural other image forming apparatuses that request authentication are independently provided, the user has to input user authentication information every time he or she accesses the respective image forming apparatuses. Therefore, the usability of the image forming apparatus is degraded. In order to solve this problem, if the plural image forming apparatuses are integrated together as a system, the use of the image forming apparatuses is made possible with a single user input of authentication information. However, constructing the system for collectively managing independently-managed authentication information is extremely expensive.

As a related technology, Patent Document 1 describes the provision of a network synchronization system and an information processing apparatus that effectively realize the synchronization of setting information among plural information processing apparatuses. Further, Patent Document 2 describes the provision of an image forming apparatus, an information synchronization system, and an information setting method capable of easily setting equipment setting information in plural image forming apparatuses.

According to the inventions disclosed in Patent Documents 1 and 2, setting information such as user information can be synchronized (shared) among the apparatuses in a network. Therefore, even if authentication information is independently managed in the respective apparatuse, the user authentication information can be collectively managed at low cost. In other words, the use of the plural apparatuses in the network is made possible with a single user input of authentication information.

Meanwhile, since an image forming apparatus is often shared by plural users, equipment statuses can be separately set for each user (for each user information set) to enhance the convenience of the apparatus. For example, the use range of authorities and functions is set for each user and each user group and generated as operating policy information in the image forming apparatus. After the generation of the operating policy, limitation on the use range of the functions and the control of function operations can be performed in accordance with the operating policy for each user and each user group. Therefore, the optimal adjustment of the operations of the image forming apparatus is made possible for each user.

By using the inventions of Patent Documents 1 and 2, the present inventor has invented a system that also synchronizes (shares) operating policy information among plural image forming apparatuses, thereby making it possible to use the plural apparatuses and control the function operations of the apparatuses in a network with a single user input of information and a single operating policy. For example, let it be assumed that user authentication information and operating policy information set in an apparatus A are synchronized with user authentication information and operating policy information set in an apparatus B. In this case, the user authentication information set in the apparatus A can be used also in the apparatus B, and the apparatus B is authorized to control the function operations in accordance with the operating policy set in the user authentication information. Thus, the convenience of an image forming system is further enhanced.

However, while it is requested that the operating policy of all the image forming apparatuses in the image forming system be synchronized in terms of the convenience described above, there is also demand for changing the operating policy for each of the image forming apparatuses.

For example, OA equipment such as an image forming apparatus is provided for each department in a company, and each department bears the output expense of the OA equipment. A department C, which prints only in-company documents, is basically prohibited from performing full-color printing that causes high cost, and thus authorized to perform only low cost black-and-white printing. Accordingly, the output expense of the OA equipment can be reduced. In the synchronization system described above, users belonging to a department D may log into the image forming apparatus of the department C to perform full-color printing. In this case, however, the output expense has to be borne by the department C in which the image forming apparatus is provided. Users belonging to the department C are configured to have an operating policy that does not authorize full-color printing, while the users belonging to a department D are configured to have an operating policy that authorizes full-color printing. Therefore, when setting information is synchronized among the image forming apparatuses of the departments C and D, the users belonging to the department D are authorized to perform full-color printing with the image forming apparatus of the department C. In this case, it is desirable that the image forming apparatus provided in the department C apply the operating policy that does not authorize full-color printing to the users belonging to the department D.

Patent Document 1: JP-A-2009-033706
Patent Document 2: JP-A-2009-064177

SUMMARY OF THE INVENTION

In view of the above problems, the present invention may provide a network synchronization system and an information processing apparatus capable of setting an operating policy in a specific apparatus or an apparatus group while effectively realizing the synchronization of setting information among plural information processing apparatuses.

According to an aspect of the present invention, there is provided a network synchronization system that is configured to include plural information processing apparatuses and synchronizes setting information among the plural information processing apparatuses. The setting information synchronized among the plural information processing apparatuses contains at least user information; user operating policy information that is applied to the information processing apparatus in accordance with the user information; first equipment group information that prescribes a first equipment group to which the information processing apparatus belongs; and equipment operating policy information that is applied to the information processing apparatus in accordance with the first equipment group to which the information processing apparatus belongs. The information processing apparatus includes a user authentication unit that authenticates a login user based on the user information; a storage unit that stores the setting information and second equipment group information that prescribes a second equipment group to which the information processing apparatus belongs; and an operating policy generation unit that generates an applied operating policy to be applied to the login user of the information processing apparatus. The operating policy generation unit generates, when the second equipment group information is contained in the first equipment group information, the applied operating policy to be applied to the login user of the information processing apparatus in accordance with the equipment operating policy information corresponding to the first equipment group information in preference to the user operating policy information corresponding to the authenticated user information.

According to another aspect of the present invention, there is provided an information processing apparatus that is connected to other information processing apparatuses and synchronizes setting information with the other information processing apparatuses. The setting information synchronized with the other information processing apparatuses contains at least user information; user operating policy information that is applied to the information processing apparatus in accordance with the user information; first equipment group information that prescribes a first equipment group to which the information processing apparatus belongs; and equipment operating policy information that is applied to the information processing apparatus in accordance with the first equipment group to which the information processing apparatus belongs. The information processing apparatus includes a user authentication unit that authenticates a login user based on the user information; a storage unit that stores the setting information and second equipment group information that prescribes a second equipment group to which the information processing apparatus belongs; and an operating policy generation unit that generates an applied operating policy to be applied to the login user of the information processing apparatus. The operating policy generation unit generates, when the second equipment group information is contained in, the first equipment group information, the applied operating policy to be applied to the login user of the information processing apparatus in accordance with the equipment operating policy information corresponding to the first equipment group information in preference to the user operating policy information corresponding to the authenticated user information.

Other objects, features and advantages of the present invention will become more apparent from the following detailed description when read in conjunction with the accompanying drawings.

BRIEF DESCRIPTION OF THE DRAWINGS

FIG. 5 shows an example of equipment information;

FIG. 6 shows an example of system setting information;

FIG. 7 shows an example of user information;

FIG. 8 shows an example of user group management information;

FIG. 9 shows an example of equipment group management information;

FIG. 13 is a flowchart showing operating policy generation processing by an operating policy generation unit.

DETAILED DESCRIPTION OF THE PREFERRED EMBODIMENTS

Hereinafter, a description is made of the best mode for carrying out an embodiment of the present invention with reference to the accompanying drawings. The embodiment describes a case in which an information processing apparatus according to the present invention is applied to a so-called MFP where a copy function, a facsimile (FAX) function, a printing function, a scanner function, an input image (a document image read by the scanner function or an image input by the facsimile function) distribution function, etc., are combined with each other. Note that the embodiment of the present invention is not limited to the MFP but is also applicable to general computer devices, etc.

(System Configuration Example)

Figure 1:
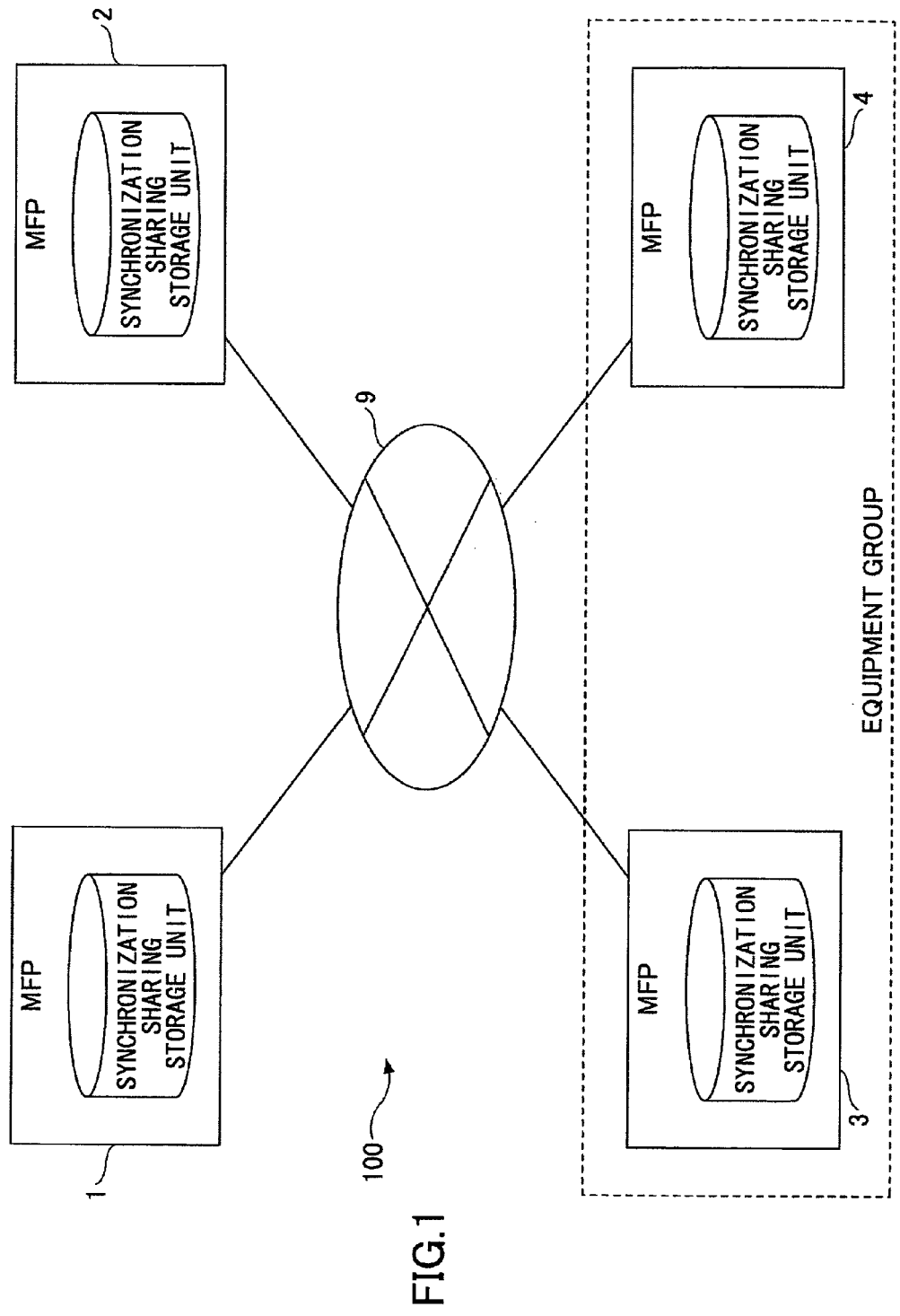
FIG. 1 is a diagram showing a configuration example of a network synchronization system according to an embodiment.

FIG. 1 is a diagram showing a configuration example of a network synchronization system according to the embodiment. In FIG. 1, the network synchronization system 100 is configured to include plural MFPs 1 through 4, all of which are connected to each other via a network 9.

As described above, the MFPs 1 through 4 are image processing apparatuses where the copy function, the facsimile (FAX) function, the printing function, the scanner function, the input image distribution function, etc., are combined with each other. Each of the MFPs 1 through 4 belonging to the network synchronization system 100 has a synchronization sharing storage unit. As to the synchronization of setting information, the setting information (such as user information and operating policy information) of each of the MFPs 1 through 4 is first placed in the synchronization sharing storage unit and then synchronized (updated) among the MFPs 1 through 4. After the synchronization of the setting information, the setting information placed in the synchronization sharing storage unit of each of the MFPs 1 through 4 becomes basically the same. Then, each of the MFPs 1 through 4 controls its operations in accordance with the setting information after the synchronization. Note that since details about the synchronization can be referred to the inventions described in Patent Documents 1 and 2, etc., further descriptions thereof are omitted here.

Further, in the embodiment, the plural MFPs may also be classified into groups and registered as equipment groups. For example, in FIG. 1, the MFPs 3 and 4 are registered in the same equipment group. In the network synchronization system according to the embodiment, the setting information is effectively synchronized among the MFPs. Accordingly, the operations of the MFPs can be controlled with the same user information and operating policy. In addition, the operations of the MFPs 3 and 4 registered in the equipment group can be controlled with an operating policy different from those of the MFPs 1 and 2 that do not belong to any equipment group, which is described in detail below.

(MFP)

Figure 2:
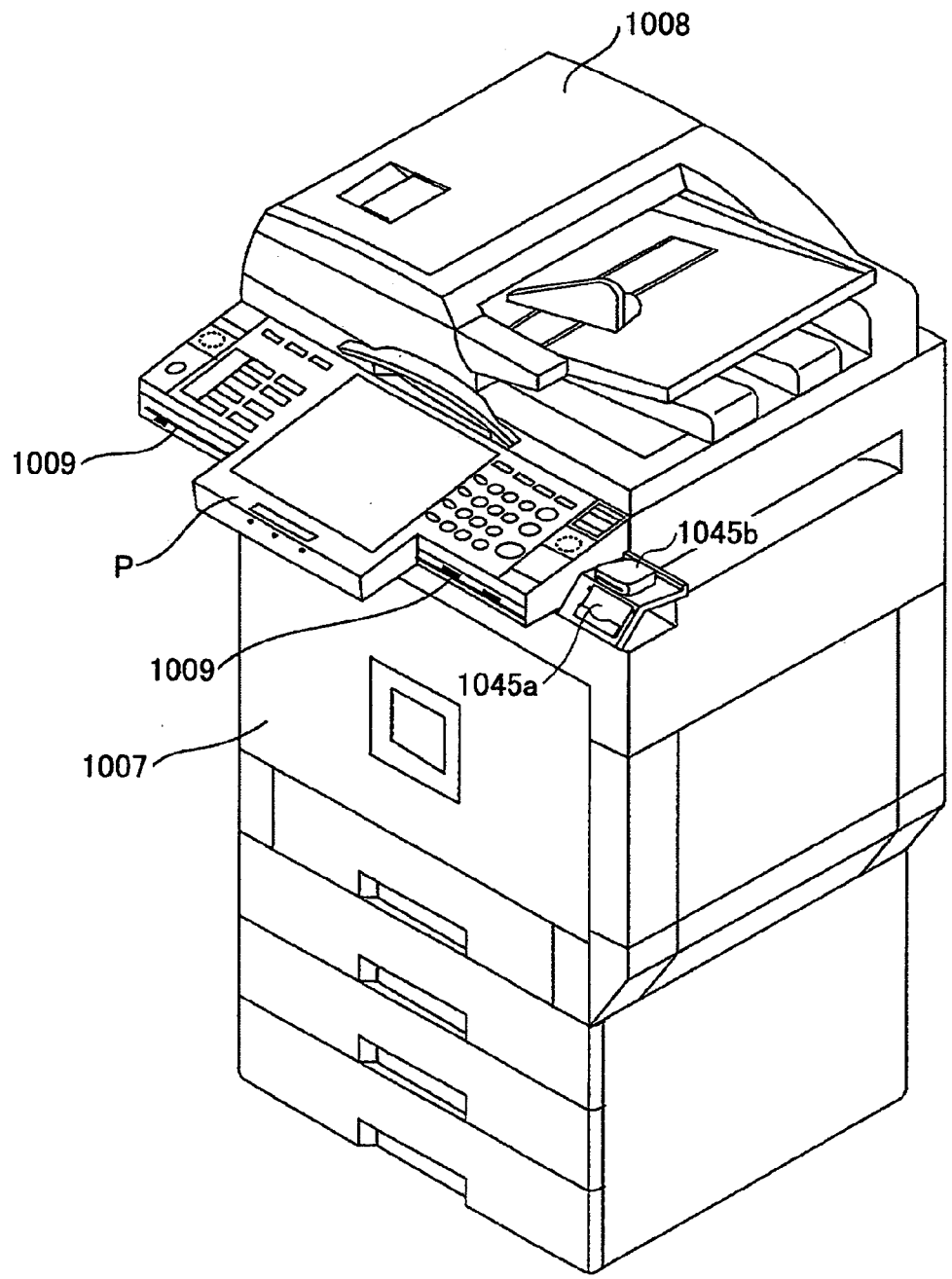
FIG. 2 is an external perspective view schematically showing a MFP.
Figure 3:
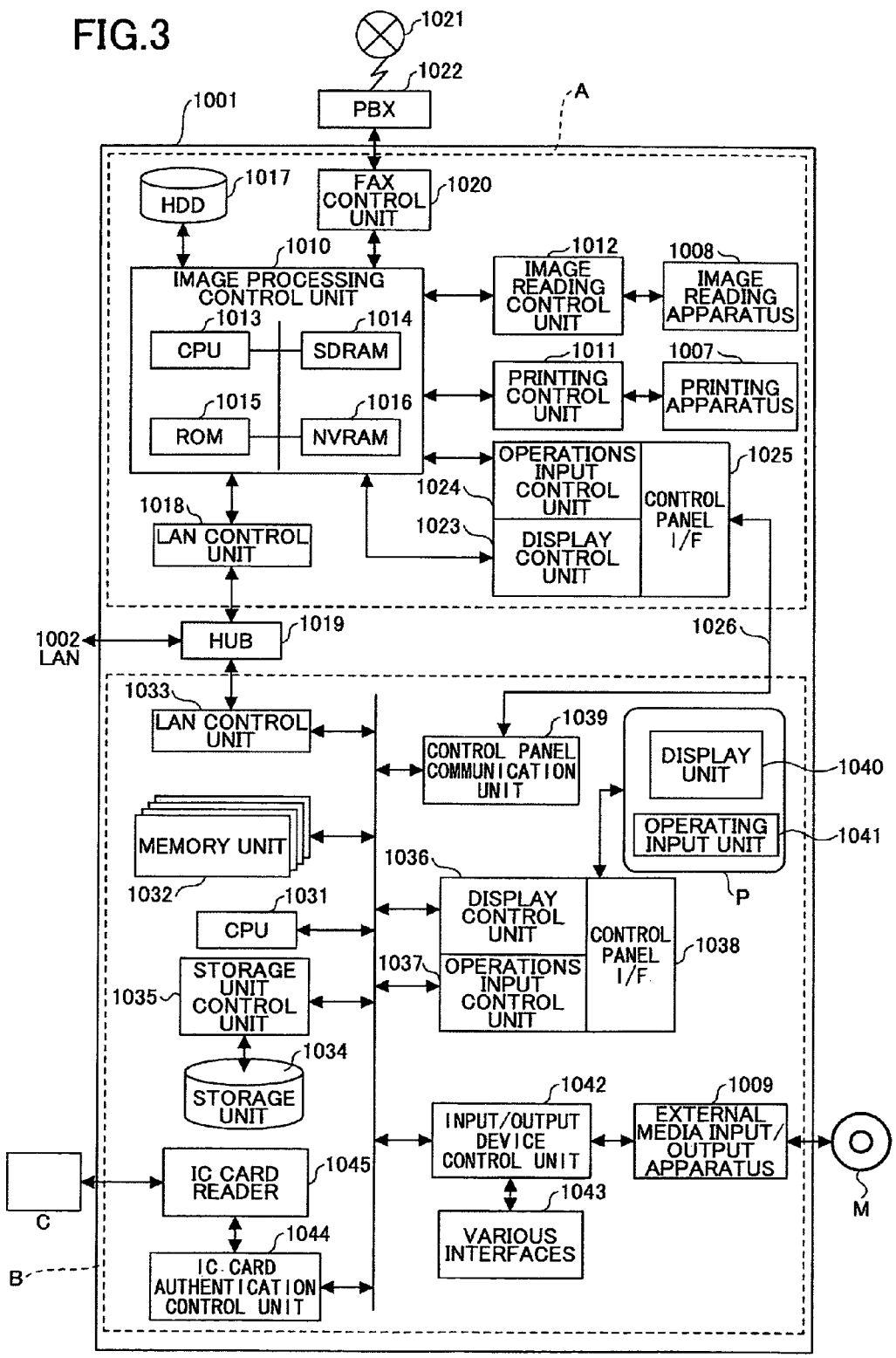
FIG. 3 is a block diagram showing electrical connections between the units of the MFP.

A description is made of the hardware of the MFP with reference to FIGS. 2 and 3. Note that descriptions about the MFP can also be applied to the MFPs 1 through 4. FIG. 2 is an external perspective view schematically showing the MFP, and FIG. 3 is a block diagram showing electrical connections between the units of the MFP.

As shown in FIG. 2, the MFP is configured to have an image reading apparatus 1008 that reads an image from a document above a printing apparatus 1007 that forms an image on a medium such as a transfer sheet. Further, at the external surface of the image reading apparatus 1008, an operations panel P is provided to display information to an operator and receive various inputs such as function settings from the operator. Moreover, under the operations panel P, an external media input/output apparatus 1009 is provided. The external media input/output apparatus 1009 reads program code, image data, etc., stored in a storage medium M such as an optical disk and a flexible disk, and writes the program code, image data, etc., in the storage medium M. Note that the external media input/output apparatus 1009 has an insertion slot exposed externally to receive the storage medium M.

Further, in the MFP shown in FIG. 2, a contact-type IC card reader 1045*a* and a non-contact-type IC card reader 1045*b* are arranged. An IC card C, which is inserted in the contact-type IC card reader 1045*a* and used (or held near the non-contact-type IC card reader 1045*b* and used), is one of ID cards that are distributed to, e.g., respective operators of the MFP and records authentication information, etc., for specifying the respective operators. When authentication information, etc., recorded in such an IC card C are read by the contact-type IC card reader 1045*a* (or the non-contact-type IC card reader 1045*b*), the use of the MFP can be synchronized within the range of an authority assigned corresponding to the authentication information, etc.

FIG. 3 is the block diagram showing the electrical connections between the respective units of the MFP. As shown in FIG. 3, the basic configuration of the MFP is roughly divided into an image processing unit section A and an information processing unit section B. The printing apparatus 1007 and the image reading apparatus 1008 belong to the image processing unit section A. The operations panel P, the external media input/output apparatus 1009, and the IC card reader 1045 belong to the information processing unit section B that performs various information processing.

The image processing unit section A, which is shown in FIG. 3 and has the printing apparatus 1007 and the image reading apparatus 1008, has an image processing control unit 1010. The image processing control unit 1010 controls all the image processing in the image processing unit section A. The image processing control unit 1010 is connected to a printing control unit 1011 that controls the printing apparatus 1007 and to an image reading control unit 1012 that controls the image reading apparatus 1008.

As shown in FIG. 3, the information processing unit section B having the operations panel P is configured to include a microcomputer controlled by a general-purpose OS (Operating System) used for an information processing apparatus generally called a personal computer. The information processing unit section B has a CPU 1031 as a main processor. The CPU 1031 is connected to a memory unit 1032 and a storage device control unit 1035 via a bus. Note that the memory unit 1032 is configured to include a RAM as the work area of the CPU 1031 and a ROM as a read-only memory that stores a starting program, etc. The storage unit control unit 1035 controls the input and output of data to and from a storage unit 1034 such as a HDD that stores an OS and programs.

The above is the description of the hardware (outline) of the MFP according to the embodiment. Since details about the hardware of the MFP can be referred to in Patent Document 1 (e.g., at paragraphs 0086 through 0131), further descriptions thereof are omitted here.

(Function)

Figure 4:
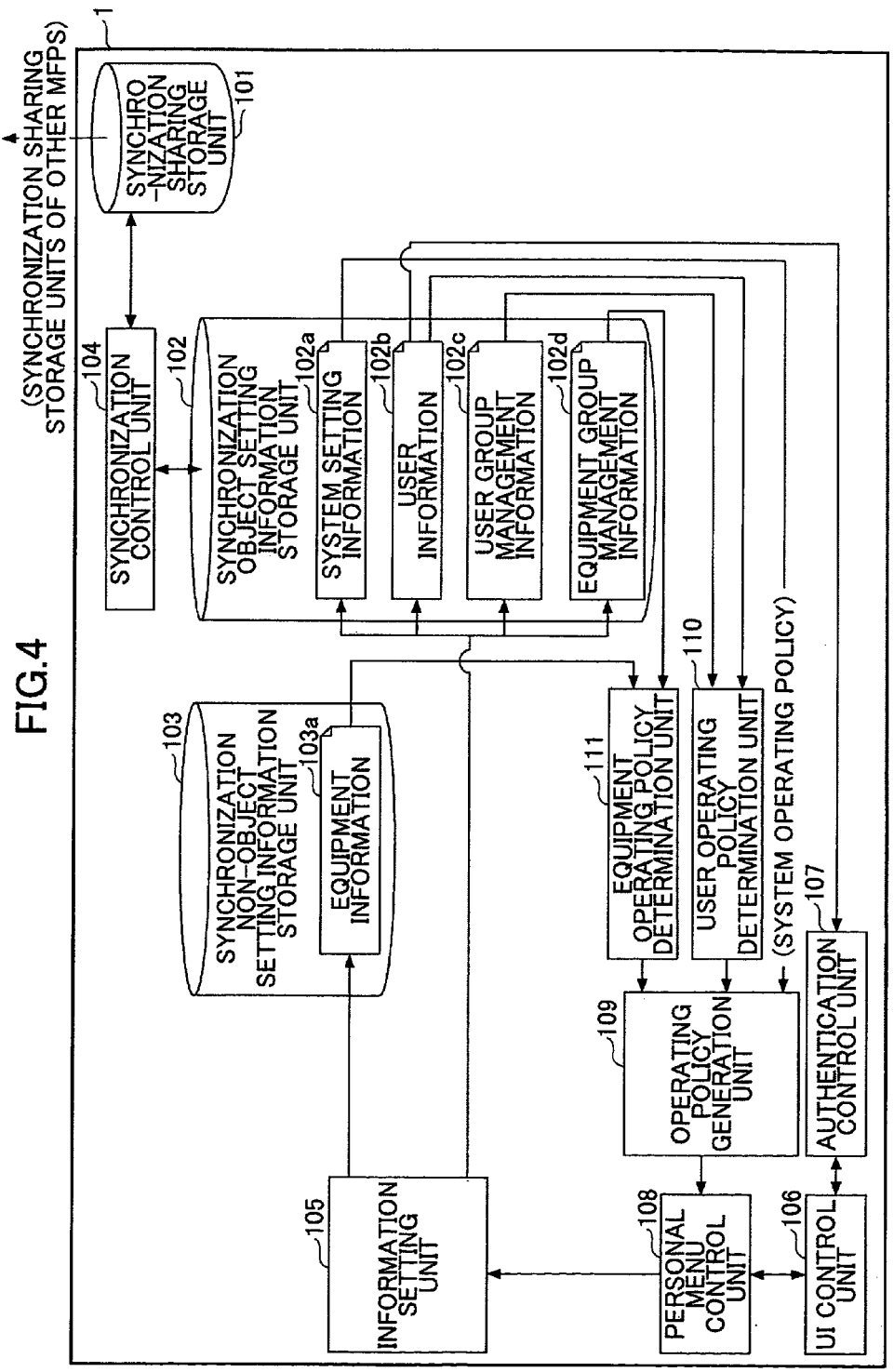
FIG. 4 is a function block diagram showing the configuration of main functions according to the embodiment.

FIG. 4 is a function block diagram showing the configuration of main functions according to the embodiment. The MFP 1 is configured to include a synchronization sharing storage unit 101, a synchronization object setting information storage unit 102, a synchronization non-object setting information storage unit 103, a synchronization control unit 104, an information setting unit 105, a UI (User Interface) control unit 106, an authentication control unit 107, a personal menu control unit 108, an operating policy generation unit 109, a user operating policy determination unit 110, and an equipment operating policy determination unit 111, which are briefly described below.

The synchronization sharing storage unit 101 stores setting information, etc., that should be synchronized with the MFPs 2 and 3 via a network 9. In other words, the setting information placed in the synchronization sharing storage unit 101 is synchronized with those of the synchronization sharing storage units of the MFPs 2 and 3.

The synchronization object setting information storage unit 102 stores the setting information to be synchronized with the other MFPs. The setting information stored in the synchronization object setting information storage unit 102 is first placed in the synchronization sharing storage unit 101 and then actually synchronized. Note that the setting information stored in the synchronization object setting information storage unit 102 contains system setting information 102*a*, user information 102*b*, user group management information 102*c*, equipment group management information 102*d*, etc. These information items are also placed in the synchronization sharing storage unit 101 and synchronized with those of other MFPs, which are described in detail below.

The synchronization non-object setting information storage unit 103 stores setting information that does not serve as an object to be synchronized with those of the other MFPs. For example, since equipment information 103*a* inherent in the MFP is not to be synchronized, it is stored in the synchronization non-object setting information storage unit 103.

The synchronization control unit 104 synchronizes the setting information, which is stored in the synchronization sharing storage unit 101 and serves as an object to be synchronized, with those of the MFPs 2 and 3 via the network 9. Note that since the mechanism of network synchronization can be referred to in the invention described in Patent Document 1, further descriptions thereof are omitted here.

The information setting unit 105 is a function unit that sets (adds, changes, deletes, etc.,) the various setting information items stored in the synchronization object setting information storage unit 102 and the synchronization non-object setting information storage unit 103. The setting information serving as an object to be synchronized set by the information setting unit 105 of one MFP is first placed in the synchronization sharing storage unit 101 and then synchronized with those of other MFPs with predetermined synchronization timing. In other words, the setting information set by the information setting unit 105 of one of the MFPs is reflected in the setting information items of the other MFPs.

The UI control unit 106 has the function of controlling an interface with the user. The UI control unit 106 causes a display unit 1040 to display a user screen and receive operating instructions and input information from the user through an operating input unit 1041. Regarding the input information, user information (e.g., a user name and a password), which the user inputs on the operations panel P through the UI control unit 106, is supplied to the authentication control unit 107.

The authentication control unit 107 (user authentication unit) authenticates a login user based on user information. The authentication control unit 107 acquires the user information 102b from the synchronization object setting information storage unit 102, and then authenticates (determines) whether e.g., a user name and a password contained in the user information 102b match user information (e.g., a user name and a password) supplied from the UI control unit 106. When both of the user information items match with each other, the authentication control unit 107 determines that authentication is successful and thus authorizes the user to log into the MFP. Note that the authentication is based on not only the user information input by the user but also user information specified by the IC card described above, fingerprints, etc.

The personal menu control unit 108 generates the personal menu of the login user after user's login. The personal menu also contains an operating policy for the login user. The operating policy applied, to the login user is generated by the operating policy generation unit 109 and then supplied to the personal menu control unit 108.

The operating policy generation unit 109 generates the operating policy to be applied to the user logging into the MFP. The operating policy generated by the operating policy generation unit 109 is supplied to the personal menu generation unit 108 and then reflected in controlling the operations of the MFP for the login user. This operating policy is finally generated as an applied operating policy to be applied to the user logging into the MFP in such a manner that the system setting information 102a (containing the operating policy that should be applied to all the users in the system) of the synchronization object setting storage unit 102, the user operating policy supplied via the user operating policy determination unit 110, and the equipment group operating policy supplied via the equipment operating policy determination unit 111 are input to the operating policy generation unit 109.

When receiving the user information 102b and the user group management information 102c from the synchronization object setting information storage unit 102, the user operating policy determination unit 110 determines the user operating policy and the user group operating policy that should be supplied to the operating policy generation unit 109.

When receiving the equipment information 103a from the synchronization non-object setting information storage unit 103 and the equipment group management information 102d from the synchronization object setting information storage unit 102, the equipment operating policy determination unit 111 determines the equipment group operating policy that should be supplied to the operating policy generation unit 109.

Note that these function units are actually implemented by a computer according to a program executed by the CPU 1031 of the MFP.

(Setting Information)

As described above, the setting information, which is stored in the synchronization object setting information storage unit 102 and then placed in the synchronization sharing storage unit 101 so as to be synchronized, contains the system setting information 102a, the user information 102b, the user group management information 102c, the equipment group management information 102d, etc. Further, the setting information, which is stored in the synchronization non-object setting information storage unit 103 and does not serve as an object to be synchronized, contains the equipment information 103a, etc. These information items are specifically shown with reference to FIGS. 5 through 9.

FIG. 5 shows an example of the equipment information. As shown in FIG. 5, the equipment information 103a contains information inherent in relevant equipment, such as a "host name," an "IP address," and a "MAC address" and information on an "equipment group" (such as a group name) to which the relevant equipment belongs. Note that since the equipment information 103a is information inherent in equipment, it is stored in the synchronization non-object setting information storage unit 103 and does not serve as an object to be synchronized via the network.

FIG. 6 shows an example of the system setting information. As shown in FIG. 6, the system setting information 102a contains information on the operating policy. In other words, the system setting information 102a prescribes information on operating policy information that should be applied not to a single user and a single equipment group but to all the users of the network synchronization system 100. Since this operating policy (referred also to as a "system operating policy") is applied to all the users, it is possible for a manager, etc., to control all the users who are synchronized with each other via the network with the same operating policy. Further, it is also possible to set each policy item in the system operating policy as "applicable" or "not applicable". Note that when it is desired to control the operating policy for each user and each equipment group depending on the policy item of the system operating policy, the policy item of the system operating policy is set as "not applicable." Thus, overwriting of the system operating policy is prevented. The system operating policy is an operating policy that should be most preferentially applied in the MFP of the network synchronization system 100. Further, since the system setting information 102a should be applied to all the users, it is stored in the synchronization object setting information storage unit 102 and serves as an object to be synchronized via the network.

FIG. 7 shows an example of the user information. As shown in FIG. 7, the user information 102b contains information such as a "personal name," a "user name (ID)," a "password," an "authority group," and an "operating policy" (referred also to as a "user operating policy") as personal information on the user. Further, information on plural users (user 1, user 2 , , , ) can be registered in the user information 102b. The "user name (ID)" and the "password" are used as the user information required for authentication. Further, the "authority group" is information (e.g., the name of a user group) on the user group to which the user belongs, and the operating policy is the user operating policy that should be applied to the user. The user operating policy is treated as, e.g., a reference operating policy and set as the initial value of the applied operating policy when the operating policy is generated. Further, since the user information 102b is information that should be held in all the MFPs from the viewpoint of the object and the problem of the network synchronization system (e.g., Patent Document 1), it is stored in the synchronization object setting information storage unit 102 and serves as an object to be synchronized via the network.

FIG. 8 shows an example of the user group management information. As shown in FIG. 8, the user group management information 102c prescribes a user group containing information such as a "group name" (referred also to as a "user group name") and an "operating policy" (referred also to as a "user group operating policy"). Further, it is possible to record information on plural user groups (user group 1, user group 2, , , ) in the user group management information 102c. Further, it is also possible to set each policy item in the user group operating policy as "applicable" or "not applicable". Note that when it is desired to control the operating policy for each user depending on the policy item of the user group operating policy, the policy item of the user group operating policy is set as "not applicable." Thus, overwriting of the user group operating policy is prevented. Further, since the user group operating policy is convenient in that the operating policy can be applied not for each user but for each group, the user group management information 102c should be held in all the MFPs. Thus, the user group management information 102c is stored in the synchronization object setting information storage unit 102 and serves as an object to be synchronized via the network.

FIG. 9 shows an example of the equipment group management information. As shown in FIG. 9, the equipment group management information 102d prescribes an equipment group containing information such as a "group name" (referred also to as an "equipment group name") and an "operating policy" (referred also to as an "equipment group operating policy") for each equipment group. Further, it is possible to record information on plural equipment groups (equipment group 1, equipment group 2, , , ) in the equipment group management information 102d. Further, it is also possible to set each policy item in the equipment group operating policy as "applicable" or "not applicable". Note that when it is desired to control the operating policy for each user and each user group depending on the policy item of the equipment group operating policy, the policy item of the equipment group operating policy is set as "not applicable." Thus, overwriting of the equipment group operating policy is prevented. Further, since the equipment group management information 102d is convenient in that the operating policy of the equipment group management information 102d can be applied for each equipment group, the equipment group management information 102d should be held in all the MFPs. Thus, the equipment group management information 102d is stored in the synchronization object setting information storage unit 102 and serves as an object to be synchronized via the network.

Here, the information items on the operating policies described above may contain the same policy items. Accordingly, preference is placed in the order of the system operating policy, the equipment group operating policy, the user group operating policy, and the user operating policy. The operating policy generation unit 109 determines the operating policy (policy item) to be applied in the order of the preference. The operating policy thus determined is contained in the personal menu described above and finally serves as the applied operating policy to be applied to the login user of the MFP.

(Operations)

Next, a description is made of operations in which the user logs into the MFP 1 of the network synchronization system 100 according to the embodiment and the applied operating policy to be applied to the user logging into the MFP 1 is finally determined. It is assumed that among the respective MFPs, the setting information items of the synchronization object setting information storage unit 102 such as the system setting information 102a, the user information 102b, the user group management information 102c, and the equipment group management information 102d are synchronized with each other under the network synchronization system 100.

Figure 10:
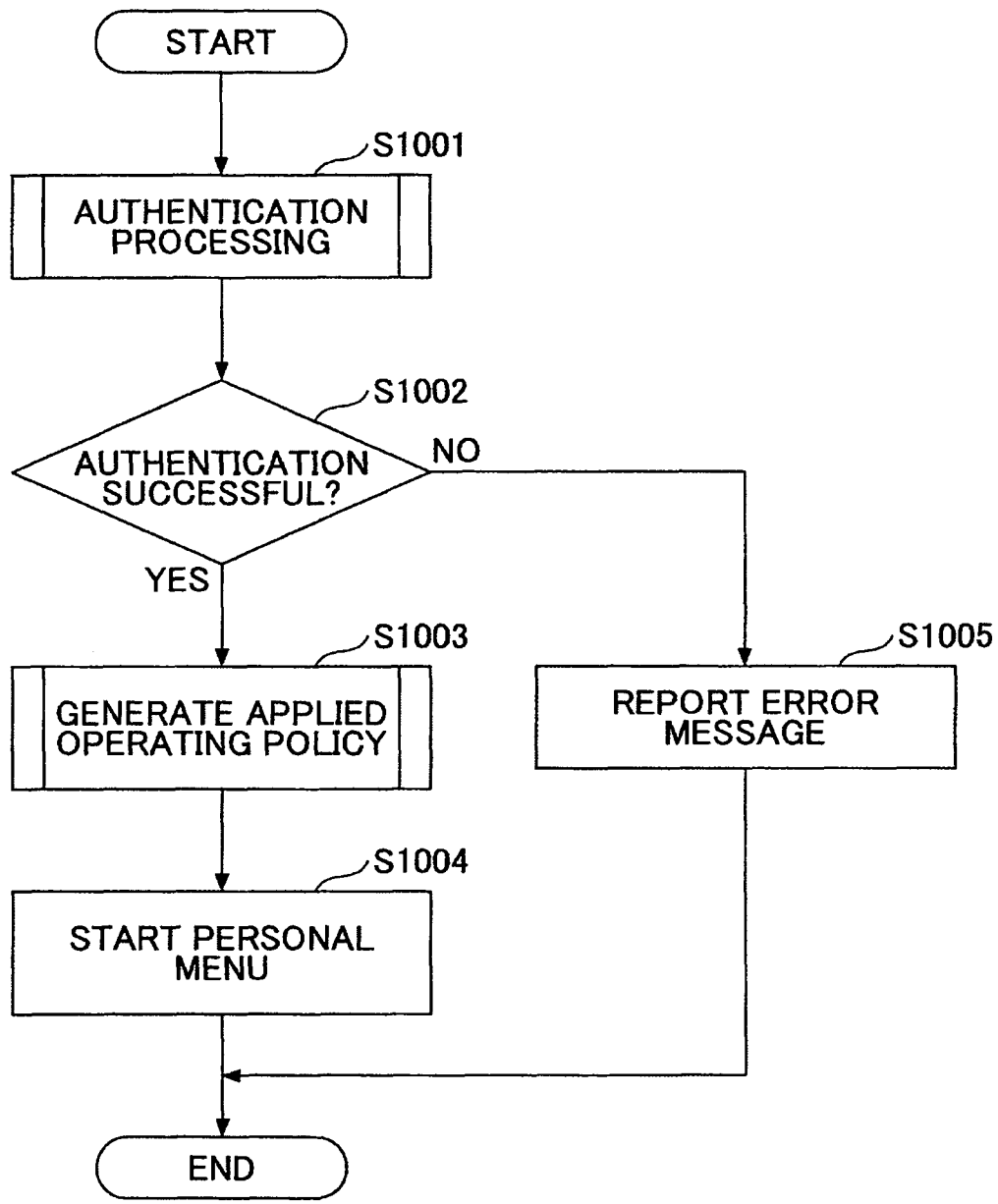
FIG. 10 is a flowchart showing an outline from user authentication to starting of a personal menu.

FIG. 10 is a flowchart showing an outline from the user authentication to the starting of the personal menu. First, the authentication control unit 107 authenticates (user authentication processing) the user (login user) logging into the MFP based on the user information (S1001). That is, the authentication control unit 107 acquires the user information 102b from the synchronization object setting information storage unit 102, and then authenticates whether the acquired user information 102b matches the user information (such as a user name and a password) supplied from the UI control unit 106. When both of the user information items match with each other, the authentication control unit 107 determines that the authentication is successful and thus authorizes the user to log into the MFP (Yes in S1002). Of course, the user information may be specified based on the IC card or the fingerprints described above so as to be used for the authentication. On the other hand, when the authentication fails in the user authentication processing (NO in S1002), the authentication control unit 107 sends an error message, etc., to the user (S1005) and completes the user authentication processing. When the authentication control unit 107 cannot normally authenticate the user information, the personal menu is not started so that the user cannot use the functions of the MFP.

When the user is authorized to log into the MFP, the operating policy generation unit 109 performs operating policy generation processing to generate the applied operating policy to be applied to the user being logged into the MFP (S1003). Since details about generating the applied operating policy to be applied to the user are described below soon, the description of the flow of the outline continues in the meantime.

After the generation of the operating policy, the personal menu control unit 108 generates the personal menu for the login user and then starts the personal menu (S1004). The personal menu also contains the applied operating policy to be applied to the login user. This is because the applied operating policy to be applied to the login user is generated by the operating policy generation unit 109 and supplied to the personal menu control unit 108.

Figure 11:
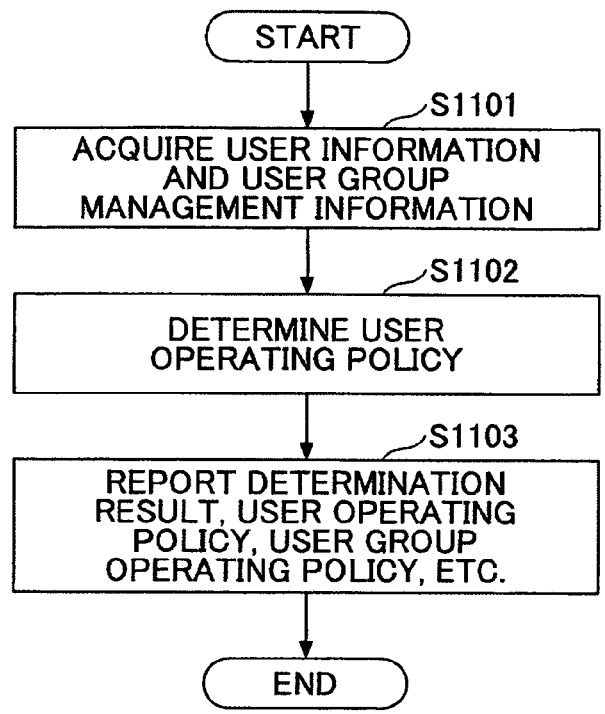
FIG. 11 is a flowchart showing the determination of a user operating policy.

FIG. 11 is a flowchart showing the determination of the user operating policy. As described above, when receiving the user information 102b and the user group management information 102c from the synchronization object setting information storage unit 102, the user operating policy determination unit 110 determines the user operating policy and the user group operating policy that should be supplied to the operating policy generation unit 109, which is described below.

When the login authentication is successful, the user operating policy determination unit 110 acquires the user information 102b and the user group management information 102c from the synchronization object setting information storage unit 102 (S1101). Then, the user operating policy determination unit 110 determines the user operating policy based on the user information 102b and the user group management information 102c (S1102). Referring again to FIGS. 7 and 8, the user operating policy determination unit 110 confirms whether, e.g., the user group prescribed corresponding to the login user in the user information 102b is prescribed in the user group management information 102c. In other words, when the user group of the login user "aaaa" is "◯◯◯" and the operating policy is prescribed corresponding to the user group "◯◯◯" in the user group management information 102c, the operating policy is the user group operating policy that should be applied to the login user "aaaa."

On the other hand, when the user group prescribed in the user information 102b corresponding to the login user is not prescribed in the user group management information 102c, the operating policy of the user group is not prescribed in the user group management information 102c. Therefore, the operating policy prescribed in the user information 102b corresponding to the login user "aaaa" serves as the user operating policy that should be applied to the login user "aaaa."

The user operating policy determination unit 110 reports a determination result and information on the operating policy to the operating policy generation unit 109 (S1103). Specifically, when the operating policy of the user group corresponding to the login user is prescribed, the user operating policy determination unit 110 reports the user group operating policy and the user operating policy to the operating policy generation unit 109. The reason why the user operating policy is also reported is that the items of the user operating policy and those of the user group operating policy may not completely match with each other. In other words, as to the items prescribed in both of the user group operating policy and the user operating policy, those prescribed in the user group operating policy may be preferentially used. However, as to the items not contained (not prescribed) in the user group operating policy but contained (prescribed) in the user operating policy, those prescribed in the user operating policy must be applied. On the other hand, when the operating policy of the user group corresponding to the login user is not prescribed, the user operating policy determination unit 110 is only required to report the user operating policy.

Figure 12:
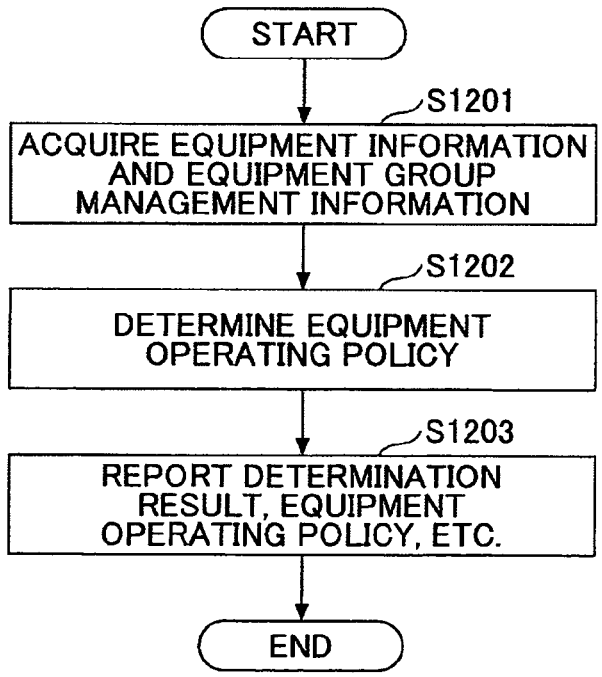
FIG. 12 is a flowchart showing the determination of an equipment operating policy.

FIG. 12 is a flowchart showing the determination of the equipment operating policy. As described above, when receiving the equipment information 103a from the synchronization non-object setting information storage unit 103 and the equipment group management information 102d from the synchronization object setting information storage unit 102, the equipment operating policy determination unit 111 determines the equipment operating policy that should be supplied to the operating policy generation unit 109, which is described below.

When the login authentication is successful, the equipment operating policy determination unit 111 acquires the equipment information 103a from the synchronization non-object setting information storage unit 103 and the equipment group management information 102d from the synchronization object setting information storage unit 102 (S1201). Then, the equipment operating policy determination unit 111 determines the equipment operating policy based on the equipment information 103a and the equipment group management information 102d (S1202). Referring again to FIGS. 5 and 9, the equipment operating policy determination unit 111 confirms whether, e.g., the equipment group prescribed in the equipment information 103a is prescribed in the equipment group management information 102d. In other words, when the equipment group is "ΔΔΔ" and the operating policy is prescribed in the equipment group management information 102d for the equipment group "ΔΔΔ," the operating policy of the equipment group management information 102d is the equipment operating policy (referred also to as the equipment group operating policy in this case) that should be applied to the equipment (MFP 1).

On the other hand, when the equipment group of the equipment information 103a is not prescribed in the equipment group management information 012d, the operating policy of the equipment group is not prescribed. Therefore, the equipment operating policy that should be applied to the equipment (MFP 1) is not prescribed.

The equipment operating policy determination unit 111 reports a determination result and information on the operating policy to the operating policy generation unit 109 (S1203). Specifically, when the equipment operating policy that should be applied to the equipment (MFP 1) is prescribed, the equipment operating policy determination unit 111 reports the equipment operating policy to the operating policy generation unit 109. On the other hand, when no equipment operating policy is prescribed, the equipment operating policy determination unit 111 is only required to report that effect to the operating policy generation unit 109.

FIG. 13 is a flowchart showing the operating policy generation processing by the operating policy generation unit 109. That is, a description is made in detail about the operating policy generation processing finally applied to the user logging into the MFP.

The operating policy generation unit 109 uses the user operating policy reported from the user operating policy determination unit 110 and temporarily stores all the policy items (values) as the applied operating policy in a memory (S1301). In other words, the user operating policy is treated as a reference operating policy and set as the initial value of the applied operating policy.

Next, a determination is made as to whether the login user belongs to a corresponding user group (S1302). When it is determined that the login user belongs to the corresponding user group, the operating policy generation unit 109 acquires one policy item (value) from the user group operating policy reported from the user operating policy determination unit 110 (S1303). Note that the user group to which the login user belongs and the item (value) of the user group operating policy can be specified according to a determination result and information on the operating policy from the user operating policy determination unit 110.

When the one item (value) of the user group operating policy is set as "applicable" (see, e.g., FIG. 8) (S1304), the operating policy generation unit 109 overwrites the same item (value) of the applied operating policy with the one item (value) of the user group operating policy (S1305). Further, after comparing one item (value) of the applied operating policy with the one item (value) of the user group operating policy and finding a difference in the item (value) between them, the operating policy generation unit 109 may overwrite the one item (value) of the user group operating policy. Note here that the item corresponds to, e.g., "accumulation," and the value corresponds to "authorized."

Thus, when the login user belongs to the user group and the user group operating policy is prescribed in the user group, the user group operating policy is applied in preference to the user operating policy.

Next, a determination is made as to whether the equipment (MFP) belongs to the equipment group (S1306). When it is determined that the equipment (MFP) belongs to the equipment group, the operating policy generation unit 109 acquires the same item (value) as the one item (value) to be overwritten from the equipment user operating policy (S1307). The equipment group to which the equipment (MFP) belongs and the item (value) of the equipment group operating policy can be specified according to a determination result and information on the operating policy from the equipment operating policy determination unit 111.

When the one item (value) of the equipment group operating policy is set as "applicable" (see, e.g., FIG. 9) (S1308), the operating policy generation unit 109 overwrites the same item (value) of the applied operating policy with the one item (value) of the equipment group operating policy (S1309). Further, after comparing one item (value) of the applied operating policy with the one item (value) of the equipment group operating policy and finding a difference in the one item (value) between them, the operating policy generation unit 109 may overwrite the one item (value) of the equipment group operating policy.

Thus, when the equipment (MFP) belongs to the equipment group and the equipment group operating policy is prescribed in the equipment group, the equipment group operating policy is preferentially applied in preference to the user operating policy and the user group operating policy.

Then, the operating policy generation unit 109 acquires one item (value) of the system operating policy corresponding to the same item (value) as the above (S1310). The one item (value) of the system operating policy can be specified by information on the system operating policy of the system setting information (see, e.g., FIG. 4).

When the one item (value) of the system operating policy is set as "applicable" (see, e.g., FIG. 6) (S1311), the operating policy generation unit 109 acquires the same item (value) as the above to be overwritten from the system operating policy and then overwrites the same item (value) of the applied operating policy with the acquired item (value) (S1312). Further, after comparing one item (value) of the applied operating policy with the one item (value) of the system operating policy and finding a difference in the one item (value) between them, the operating policy generation unit 109 may overwrite the one item of the system operating policy.

As described above, the applied operating policy in the memory is overwritten with each operating policy in accordance with the preference order as for the one policy item. However, the same processing is repeatedly applied to all the policy items (S1313→S1302). Then, when all the policy items are processed, the operating policy generation unit 109 completes the processing of the flowchart.

Thus, when the system operating policy is prescribed, the system operating policy is applied in preference to the user operating policy, the user group operating policy, and the equipment group operating policy. In other words, as described above, preference is placed in the order of the system operating policy, the equipment group operating policy, the user group operating policy, and the user operating policy. The operating policy generation unit 109 determines the operating policy (policy item) to be applied in accordance with the preference order. Then, the applied operating policy finally determined here is contained in the personal menu described above and serves as the applied operating policy to be applied to the login user of the MFP.

Referring here to FIGS. 6 through 9, the operating policy generation processing described above is specifically applied to the login user "aaaa." First, the user operating policy in the user information (FIG. 7) is initially set in the memory (S1301). Here, attention is paid to one item (value) "(b-2) full-color printing: authorized." Next, since the login user "aaaa" belongs to the user group "○○○," the user group operating policy is overwritten with the item "(b-2) full-color printing: authorized" in the applied operating policy in the present memory (S1305). Note that since there is no difference in the value (authorized) in this case, the user group operating policy may not be overwritten.

Next, since the equipment (MFP 1) belongs to the equipment group "ΔΔΔ" (FIG. 5), the equipment group operating policy of the equipment group "ΔΔΔ" is overwritten (S1309). In this case, the item "(b-2) full-color printing: authorized" is overwritten with the item "(b-2) full-color printing: unauthorized" in the applied operating policy in the present memory (FIG. 9). Then, in the system setting information, the item of "(b-2) full-color printing" is set as "not applicable." Therefore, in the applied operating policy in the present memory, the item "(b-2) full-color printing: unauthorized" is not overwritten with the item "(b-2) full-color printing: authorized" in the system setting information.

Finally, in the applied operating policy in the memory, the item "(b-2) full-color printing: unauthorized" is applied. In other words, full-color printing is originally authorized according to the user (user group) operating policy. Accordingly, the setting information is synchronized among all the MFPs in the network synchronization system 100 according to the embodiment provided that the system operating policy (system setting information) applied to all the users authorized. Therefore, all the users are authorized to perform full-color printing. More specifically, except when full-color printing is prohibited by a manager, etc., across a company, the user is authorized to perform full-color printing by logging into any of the MFPs (in any department) in the company.

However, assuming that the MFPs provided in a department are classified into an equipment group and full-color printing is unauthorized in the equipment group, the user cannot perform full-color printing with the MFPs provided in the department. Further, as described before, the department C, which prints only in-company documents, is basically prohibited from performing full-color printing that causes high cost, and thus authorized to perform only low cost black-and-white printing to save an output expense. Here, even if the users belonging to the department D are configured to have the operating policy that authorizes full-color printing, the image forming apparatuses (MFP) provided in the department C uniformly have applied the operating policy that does not authorize full-color printing to the users belonging to the department D.

As described above, the network synchronization system 100 according to the embodiment makes it possible to effectively implement the synchronization of the setting information among the plural information processing apparatuses (e.g., the MFPs) and set the operating policy for each equipment group.

In other words, according to the embodiment, it is possible to provide the network synchronization system and the information processing apparatus capable of setting the operating policy in a specific apparatus or an apparatus group while effectively realizing the synchronization of the setting information among plural information processing apparatuses.

The present invention is not limited to the specifically disclosed embodiments, and variations and modifications may be made without departing from the scope of the present invention.

SUPPLEMENT

Note that those obtained by applying the features or any combination of the expressions and the features of the present invention to a method, an apparatus, a system, a computer program, a recording medium, etc., are also effective as the embodiments of the present invention. For example, the embodiments of the present invention can be configured as the method and the program described below.

There is provided a network synchronization method of a network synchronization system that is configured to include plural information processing apparatuses and synchronizes setting information among the plural information processing apparatuses. The setting information synchronized among the plural information processing apparatuses contains at least user information; user operating policy information that is applied to the information processing apparatus in accordance with the user information; first equipment group information that prescribes a first equipment group to which the information processing apparatus belongs; and equipment operating policy information that is applied to the information processing apparatus in accordance with the first equipment group to which the information processing apparatus belongs. The information processing apparatus includes a storage step of storing the setting information and second equipment group information that prescribes a second equipment group to which the information processing apparatus belongs; a user authentication step of authenticating a login user based on the user information; and an operating policy generation step of generating an applied operating policy to be applied to the login user of the information processing apparatus. The operating policy generation step generates, when the second equipment group information is contained in the first equipment group information, the applied operating policy to be applied to the login user of the information processing apparatus in accordance with the equipment operating policy information corresponding to the first equipment group information in preference to the user operating policy information corresponding to the authenticated user information.

Further, in the network synchronization method described above, the equipment operating policy information prescribes whether each item of an equipment operating policy is applicable, and the operating policy generation step generates, as for the item prescribed to be not applicable, the applied operating policy to be applied to the login user of the information processing apparatus in accordance with the user operating policy information corresponding to the authenticated user information.

Moreover, there is also provided a program that causes a computer to execute the network synchronization method described above.

The present application is based on Japanese Priority Application No. 2009-255322 filed on Nov. 6, 2009, the entire contents of which are hereby incorporated herein by reference.

What is claimed is:

1. A network synchronization system that is configured to include a plurality of information processing apparatuses and synchronize setting information among the plurality of information processing apparatuses, the setting information synchronized among the plurality of information processing apparatuses containing at least:
  user information;
  user operating policy information that is applied to the plurality of information processing apparatuses in accordance with the user information;
  first information processing apparatus group information that prescribes a first information processing apparatus group to which the plurality of information processing apparatuses belongs; and
  information processing apparatus operating policy information that is applied to the plurality of information processing apparatuses in accordance with the first information processing apparatus group to which the plurality of information processing apparatuses belongs, the network synchronization system comprising,
  the plurality of information processing apparatuses, each information processing apparatus of the plurality of information processing apparatuses including,
    a user authentication unit configured to authenticate a login user based on the user information;
    a storage unit configured to store the setting information and second information processing apparatus group information that prescribes a second information processing apparatus group to which the information processing apparatus belongs; and
    an operating policy generation unit configured to generate an applied operating policy to be applied to the login user of the information processing apparatus, the applied operating policy indicating an output operation that the information processing apparatus is authorized to perform according to a policy item of a user group to which the login user belongs and a policy item of at least one of the first information processing apparatus group and the second information processing apparatus group to which the information processing apparatus belongs, the policy item of the at least one of the first information processing apparatus group and the second information processing apparatus group being added to the applied operating policy independently of the policy item of the user group;
  wherein the operating policy generation unit is configured to generate, when the second information processing apparatus group information is contained in the first information processing apparatus group information, the applied operating policy to be applied to the login user of the information processing apparatus including at least one policy item of the information processing apparatus operating policy information corresponding to the first information processing apparatus group information, and at least one policy item of the user operating policy information corresponding to the authenticated user information, and
  wherein the operating policy generation unit is configured to generate, when a system operating policy is applicable, the applied operating policy to be applied to the login user of the information processing apparatus including the system operating policy, and the user operating policy information corresponding to the authenticated user information.

2. The network synchronization system according to claim 1, wherein
  the information processing apparatus operating policy information prescribes whether each policy item of an information processing apparatus operating policy is applicable, and
  the operating policy generation unit is configured to generate, for the item prescribed to be not applicable, the applied operating policy to be applied to the login user of the information processing apparatus in accordance with the user operating policy information corresponding to the authenticated user information.

3. An information processing apparatus that is connected to other information processing apparatuses and synchronizes setting information with the other information processing apparatuses, the setting information synchronized with the other information processing apparatuses containing at least
  user information;
  user operating policy information that is applied to the information processing apparatus in accordance with the user information;
  first information processing apparatus group information that prescribes a first information processing apparatus group to which the information processing apparatus and the other information processing apparatuses belong; and information processing apparatus operating policy information that is applied to the information processing apparatus in accordance with the first information processing apparatus group to which the information processing apparatus belongs, the information processing apparatus comprising, a user authentication unit configured to authenticate a login user based on the user information;

a storage unit configured to store the setting information and second information processing apparatus group information that prescribes a second information processing apparatus group to which the information processing apparatus belongs; and an operating policy generation unit configured to generate an applied operating policy to be applied to the login user of the information processing apparatus according to a policy item of a user group to which the login user belongs and a policy item of at least one of information processing apparatus group to which the information processing apparatus belongs, the policy item of the at least one information processing apparatus group being added to the applied operating policy independently of the policy item of the user group, the applied operating policy indicating information processing operations that each of the plurality of information processing devices may perform, at least one of the information processing operations including an output operation; wherein the operating policy generation unit is configured to generate, when the second information processing apparatus group information is contained in the first information processing apparatus group information, the applied operating policy to be applied to the login user of the information processing apparatus including at least one policy item of the information processing apparatus operating policy information corresponding to the first information processing apparatus group information, and at least one policy item of the user operating policy information corresponding to the authenticated user information, and the operating policy generation unit is configured to generate, when a system operating policy is applicable, the applied operating policy to be applied to the login user of the information processing apparatus including the system operating policy, and the user operating policy information corresponding to the authenticated user information.

4. The information processing apparatus according to claim 3, wherein the information processing apparatus operating policy information prescribes whether each policy item of an information processing apparatus operating policy is applicable, and the operating policy generation unit is configured to generate, for the item prescribed to be not applicable, the applied operating policy to be applied to the login user of the information processing apparatus in accordance with the user operating policy information corresponding to the authenticated user information.

5. A network synchronization method of a network synchronization system that is configured to include a plurality of information processing apparatuses and synchronize setting information among the plurality of information processing apparatuses, the setting information synchronized among the plurality of information processing apparatuses containing at least, user information;

user operating policy information that is applied to the plurality of information processing apparatuses in accordance with the user information;

first information processing apparatus group information that prescribes a first information processing apparatus group to which the plurality of information processing apparatuses belongs; and information processing apparatus operating policy information that is applied to the plurality of information processing apparatus in accordance with the first information processing apparatus group to which the plurality of information processing apparatuses belongs, wherein the network synchronization method comprises:

storing, by each information processing apparatus, the setting information and second information processing apparatus group information that prescribes a second information processing apparatus group to which the information processing apparatus belongs;

authenticating, by each information processing apparatus, a login user based on the user information; and generating, by each information processing apparatus, an applied operating policy to be applied to the login user of the information processing apparatus according to a policy item of a user group to which the login user belongs and a policy item of at least one of information processing apparatus group to which each of the information processing apparatuses belong, the policy item of the at least one information processing apparatus group being added to the applied operating policy independently of the policy item of the user group, the applied operating policy indicating information processing operations that each of the plurality of information processing apparatuses may perform, at least one of the information processing operations including an output operation; wherein the generating generates, if the second information processing apparatus group information is contained in the first information processing apparatus group information, the applied operating policy to be applied to the login user of the information processing apparatus, including at least one policy item of the information processing apparatus operating policy information corresponding to the first information processing apparatus group information, and at least one policy item of the user operating policy information corresponding to the authenticated user information, and the generating generates, if a system operating policy is applicable, the applied operating policy to be applied to the login user of the information processing apparatus including the system operating policy, and the user operating policy information corresponding to the authenticated user information.

6. The network synchronization method according to claim 5, comprising:

prescribing, by the information processing apparatus operating policy information whether each policy item of an information processing apparatus operating policy is applicable, and the generating step generates, for the item prescribed to be not applicable, the applied operating policy to be applied to the login user of the information processing apparatus in accordance with the user operating policy information corresponding to the authenticated user information.

7. The network synchronization system according to claim 1, further comprising:
generating, by the operating policy generation unit, when the system operating policy is applicable, the applied operating policy to be applied to the login user of the information processing apparatus in accordance with the system operating policy, in preference to the information processing apparatus operating policy information corresponding to the first information processing apparatus group information.

8. The network synchronization system according to claim 1, wherein the system operating policy applies to all users of the network synchronization system.

9. The network synchronization system according to claim 1, wherein the user operating policy information includes user group operating policy information.

10. The information processing apparatus according to claim 3, wherein the operating policy generation unit generates, when the system operating policy is applicable, the applied operating policy to be applied to the login user of the information processing apparatus in accordance with the system operating policy, in preference to the information processing apparatus operating policy information corresponding to the first information processing apparatus group information.

11. The information processing apparatus according to claim 3, wherein the system operating policy applies to all users of the network synchronization system.

12. The information processing apparatus according to claim 3, wherein the user operating policy information includes user group operating policy information.

13. The network synchronization method according to claim 5, comprising:
generating by the operating policy generation unit, when the system operating policy is applicable, the applied operating policy to be applied to the login user of the information processing apparatus in accordance with the system operating policy, and the information processing apparatus operating policy information corresponding to the first information processing apparatus group information.

14. The network synchronization method according to claim 5, further comprising applying the system operating policy to all users of the network synchronization system.

15. The network synchronization method according to claim 5, wherein the user operating policy information includes user group operating policy information.

* * * * *